United States Patent Office 3,178,345
Patented Apr. 13, 1965

3,178,345
TOPICAL STEROID COMPOSITION
Carl A. Schlagel, Kalamazoo, Mich., assignor to The Upjohn Company, Kalamazoo, Mich., a corporation of Delaware
No Drawing. Filed Jan. 20, 1964, Ser. No. 338,584
8 Claims. (Cl. 167—58)

This application is a continuation-in-part of copending application Serial No. 87,751, filed February 8, 1961, now abandoned.

This invention relates to pharmaceutical compositions for topical use and, more particularly, to such compositions in which the primary active ingredients are synergistic combinations of certain flavones and steroids.

The topical anti-inflammatory compositions of this invention comprise, as primary active ingredients, synergistic amounts of (1) an anti-inflammatory steroid of the formula

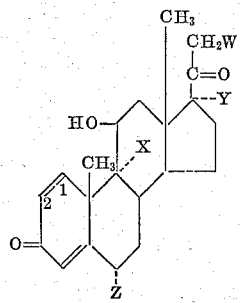

wherein W is hydrogen, hydroxy or alkanoyloxy in which the alkyl group contains 1 through 5 carbon atoms, X is hydrogen or fluoro, Y is hydrogen or hydroxy, Z is hydrogen or methyl, and the 1–2 carbon atom linkage is single or double bond, and (2) flavone or 3-hydroxyflavone, said active ingredients being dispersed in a pharmaceutically acceptable topical carrier. The method hereof for treating inflammatory conditions amenable to topical therapy comprises topically applying such compositions at the site of the inflammation.

The flavone components of the present active ingredients are those of the formula

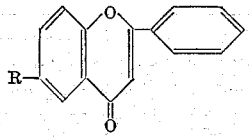

wherein R is hydrogen or hydroxy. Representative steroids with which the said flavones are combined include: hydrocortisone, hydrocortisone acetate, hydrocortisone 21-hemisuccinate, hydrocortisone 21-benzoate, hydrocortisone 21-pelargonate, hydrocortisone 21-laurate, 9α-fluorohydrocortisone, 6α - methylhydrocortisone acetate, prednisolone, 6α-methylprednisolone, 6α-methylprednisolone acetate, 6α-methyl-9α-fluoropredisolone, 6α-methyl-9α-fluoroprednisolone acetate, 6α-methyl-9α-fluoro-21-desoxyhydrocortisone, 6α,9α-difluoroprednisolone acetate, 6α,9α-difluoroprednisolone, 6α-methyl-9α-fluoro-21-desoxyprednisolone 17-acetate, 6α-methyl-9α-fluoro-11β-hydroxyprogesterone, 6α-methyl-9α-fluoro-11β,17α-dihydroxy-1,4-pregnadiene-3,20-dione, 9α-fluoro-11β,17α-21-trihydroxy - 4 - pregnene - 3,20 - dione, 11β - hydroxy-6α-methylprogesterone, 9α - fluoroprednisolone, 9α - fluoroprednisolone acetate and the like. Included also are the alkali metal phosphates, hydrocarbon dicarboxylic acid 21-esters such as hemisuccinate, hemiglutarate, hemi-β,β-dimethylglutarate, hemimaleate and the like, and the water-soluble salts of such esters as the alkali metal salts (e.g., sodium, potassium) and amine salts (e.g., diethanolamine, epinephrine).

Synergism in varying degrees can be expected to result from the combination of flavone or 3-hydroxyflavone and the steroids of the above formula throughout the practicable concentration ranges for both ingredients. The upper and lower limits vary widely with the ingredients and relative concentrations. In general, concentrations of steroid from about 0.001% to about 5% and of the flavone from about 0.1% to about 25% embrace the ranges of primary interest. A small but perceptible amount of either component will enhance the effectiveness of a normal amount of the other component. The compositions herein are useful in the treatment of inflammatory conditions amenable to topical therapy in humans and animals on a schedule of, preferably, an application at the site of the inflammation one to three times daily.

The unexpectedly high anti-inflammatory activity of these combinations when applied topically has been demonstrated in tests on humans. Because of the virtual impossibility of conducting controlled studies on human patients exhibiting a variety of skin erythemas as seen in the clinic, test procedures have been developed whereby an experimental inflammation is induced at selected locations on the subject's skin and the effectiveness of agents in reducing the resulting erythema observed. The inflammatory condition thus produced is a true contact dermatitis, genuine in every clinical respect, differing only in origin from the "natural" erythema. It can be accurately reproduced, and the treated and untreated areas can be directly compared. Sites of inflammation can be chosen and "standardized" between subjects comprising a single test series. The subjective influence in reading and interpreting the appearance of experimentally-induced inflammations cannot, of course, be entirely eliminated; but its effects are significantly less than prevail in clinical observations of skin erythemas of natural origin. Moreover, the subjective aspect in the experimental procedure can be further minimized by limiting the readings in any series of tests to those of a single, experienced and qualified observer. This observer also can frequently check the consistency of his observations and their conformity to the predetermined standards on which he is operating. Thus the experimental approach offers substantial advantages in the comparative testing of anti-inflammatory compositions over observations from clinical practice. Significantly, evaluation of other anti-inflammatory agents in humans by this test has given good correlation with results obtained in extended clinical use.

Representative compositions of those disclosed herein have been observed by skilled investigators and compared for topical anti-inflammatory activity according to the method of Schlagel and Northam, Soc. Exper. Biol. and Med. 101: 629 (1959), with the modification that 30 male subjects were employed in each assay. In the chosen assay the property of tetrahydrofurfuryl alcohol (THFA) of producing an erythema on contact with human skin served as the basis for the study. Thus, flavonoids and combinations of steroids and flavonoids were dissolved in THFA and these solutions applied to the skin, the anti-inflammatory activity of the ingredients being demonstrated by their ability to inhibit or reduce the erythema. In the actual conduct of the test, a control era of inflammation (contact dermatitis) was produced at a randomly selected site on the volar aspect of one forearm of each volunteer by an eighteen-hour application of a dressing wetted with 0.25 ml. of THFA. Each of nine other areas, giving a total of five spots on each forearm, was similarly treated with the sample under study dissolved in 0.25 ml. of THFA. The treatments were assigned to the 30 subjects comprising each assay and to the positions on the arms in such way that effects associated with subjects and positions were eliminated from treatment comparisons. The actual design of the experiment constituted a set of three 10 by 10 Latin Squares. During the test a pronounced and uninhibited erythema developed at the control sites, while the erythema was prevented completely or reduced in various degrees at the treated sites.

The term "topical" as employed in this application relates to the introduction of the medication, incorporated in a suitable base or vehicle, at the site of the inflammation for exertion of local action. Accordingly, such topical compositions include those pharmaceutical forms in which the medication is applied externally by direct contact with the surface to be treated. Conventional pharmaceutical forms for this purpose include ointments, lotions, pastes, sprays, jellies, powders, eye and ear drops, suppositories and the like. The term "ointment" embraces formulations (including creams) having oleaginous, absorption, water-soluble and emulsion-type bases as described in Remington's Practice of Pharmacy, 11th edition (1956), page 336, Mack Publishing Company.

Various other active ingredients can be included in the formulations of the present invention to provide a desirable supplementary effect which, when employed in the treatment of particular conditions, enhance the usefulness of the basic combinations. Thus, various antibiotics (including their salts) such as neomycin, the tetracyclines, novobiocin, erythromycin, penicillin, chloramphenicol, streptomycin, bacitracin, polymyxin, tyrothricin and gramicidin alone or in combination; antifungal agents such as iodochlorohydroxyquin, filipin and nystatin; vasoconstrictors such as phenylephrine and isoproterenol, and local anesthetic agents such as procaine hydrochloride, ethylaminobenzoate, phenacaine hydrochloride, tetracaine hydrochloride, lidocaine hydrochloride, primoxine hydrochloride, and the like can be included in the formulation.

Broadly described, the method for the preparation of pharmaceutically acceptable formulations involves the incorporation of the primary active ingredients, together with any supplementary active ingredients to be included, into the selected pharmaceutical carrier, utilizing techniques well known in the art. By "pharmaceutically acceptable carrier" or "base" as used herein is meant the vehicle into which the active ingredients are incorporated, the said vehicle comprising various pharmaceutically and physiologically suitable additives for the purpose of facilitating the formulation of the said active ingredients into the desired pharmaceutical form appropriate for the contemplated use in human or veterinary therapy.

The following examples illustrate the best mode contemplated by the inventor for carrying out the invention, but such are not to be construed as limiting the scope thereof.

EXAMPLE 1

*Ointment*

Five kilograms of an ointment containing 0.025% of 6α-methyl-9α-fluoro-21-desoxyprednisolone and 1% flavone is prepared from the following materials, the percentages being by weight:

| | Gm. |
|---|---|
| 4% Multiwax No. W-445[1] | 200 |
| 20% white mineral oil, U.S.P., viscosity 180 | 1000 |
| 0.5% cholesterol, U.S.P. | 25 |
| 0.02% methylparaben, U.S.P. | 1 |
| 0.18% n-butyl-p-hydroxybenzoate | 9 |
| 0.025% 6α-methyl-9α-fluoro-21-desoxyprednisolone | 1.25 |
| 1% flavone | 50 |
| White petrolatum, U.S.P., q.s. | 5000 |

[1] High melting point wax from L. Sonneborn and Sons, Inc., New York, N.Y.

The petrolatum and Multiwax are melted together and the mineral oil added. The mixture is heated to 190° F. and the cholesterol added. After cooling to 170° F., the paraben and hydroxybenzoate are introduced. The resulting mixture is strained and cooled to between 130 and 135° F. The steroid and flavone are added and mixed in thoroughly with a high-speed mixer. The whole is then passed through a mill and mixed in a high-speed mixer until the product is congealed. The product is then ready for potency assay and packaging.

The foregoing ointment can be employed in the treatment of allergic dermatoses and other inflammatory skin conditions, such as contact dermatitis, atopic dermatitis, neurodermatitis, anogenital pruritus, seborrheic dermatitis and the like. The ointment is rubbed gently into the affected area three times daily.

Substitution of 0.001% of the steroid and 0.1% flavone above gives a composition appropriate for use in the same manner.

A high potency combination suitable for application once daily is obtained by substituting 5% of the steroid and 25% flavone for the amounts given.

Addition of 50 gm. of novobiocin acid calcium, 150 gm. of tetracycline hydrochloride, 50 gm. of bacitracin (50 units per mg.), 165 gm. of nystatin (3000 units per mg.), 50 gm. of filipin, 2.5 gm. of polymyxin B sulfate (10,000 units per mg.), 25 gm. of erythromycin, a combination of 37.5 gm. of neomycin sulfate and 50 gm. of filipin, a combination of 37.5 gm. of neomycin sulfate, 50 gm. of bacitracin (50 units per mg.) and 2.5 gm. of polymyxin B sulfate (10,000 units per mg.), a combination of 37.5 gm. of neomycin sulfate and 25 gm. of erythromycin, or a combination of 37.5 gm. of neomycin sulfate and 150 gm. of tetracycline hydrochloride is productive of an ointment having application as above in a variety of clinical conditions amenable to topical antiinflammatory therapy.

EXAMPLE 2

*Ointment, ophthalmic*

Ten kilograms of an ophthalmic ointment containing 0.04% 6α-methyl-9α-fluoro-11β-hydroxyprogesterone and 0.3% flavone is prepared from the following materials:

| | Gm. |
|---|---|
| 25% light mineral oil, U.S.P. | 2500 |
| 20% wool fat, U.S.P. | 2000 |
| 0.04% 6α-methyl-9α-fluoro-11β-hydroxyprogesterone | 4 |
| 0.3% flavone | 30 |
| White petrolatum, U.S.P., q.s. | 10,000 |

The 6α-methyl-9α-fluoro-11β-hydroxyprogesterone and flavone are ground with the mineral oil in a colloid mill. The wool fat and petrolatum are melted, strained, and the temperature adjusted to 45 to 50° C. The mineral oil slurry is added with thorough stirring which is continued until the temperature drops to about 35° C. The product is then ready for potency assay and filling into ophthalmic tubes.

The ointment is placed in the conjunctival sac three times daily for treatment of inflammatory conditions of the eye, such as allergic conjunctivitis.

Following exactly the procedure above but including in the formulation 66.7 gm. of neomycin sulfate is productive of an ophthalmic ointment having wide application in treatment of inflammatory conditions of the eye originating with or complicated by bacterial infections.

Similarly, substitution of 300 gm. of tetracycline hydrochloride for the neomycin is productive of an ophthalmic ointment advantageously used where the bacterial infection is believed susceptible to tetracycline.

EXAMPLE 3

*Cream*

A cream containing 0.3% hydrocortisone and 0.3% 3- hydroxyflavone is prepared in a 1000-gm. lot from the following materials:

| | Gm. |
|---|---|
| 15% Tegacid Regular[1] | 150 |
| 10% spermaceti, U.S.P. | 100 |
| 5% propylene glycol, U.S.P. | 50 |
| 0.5% polysorbate 80, U.S.P. | 5 |
| 0.1% methylparaben, U.S.P. | 1 |
| 0.3% hydrocortisone | 3 |
| 0.3% 3-hydroxyflavone | 3 |
| Deionized water, q.s. | 1000 |

[1] Self-emulsifying glyceryl monostearate from Goldschmidt Chemical Corporation, New York, N.Y.

The Tegacid and spermaceti are melted together at a temperature of 70 to 80° C. The methylparaben is dissolved in about 500 gm. of water, and the propylene glycol, polysorbate 80, hydrocortisone and 3-hydroxyflavone are added in turn, maintaining a temperature of 75 to 80° C. The methylparaben mixture is added slowly to the Tegacid and spermaceti melt, with constant stirring. The addition is continued for at least 30 minutes with additional stirring until the temperature has dropped to 40 to 45° C. The pH of the final cream is adjusted to 3.5 by incorporating, with stirring, 2.5 gm. of citric acid, U.S.P., and 0.2 gm. of dibasic sodium phosphate heptahydrate dissolved in about 50 ml. of water. Finally, sufficient water is added to bring the final weight to 1000 gm. and the preparation is stirred until homogeneous. The resulting product is then assayed and packaged for clinical use.

The above cream is applied once daily to the inflamed area.

EXAMPLE 4

Lotion

Ten liters of a viscous lotion containing 1% 6α-methyl-prednisolone and 1% flavone is prepared from the following materials.

Per ml.:

| | Gm. |
|---|---|
| 50 mg. propylene glycol, U.S.P. | 500 |
| 2 mg. methylparaben, U.S.P. | 20 |
| 3 mg. n-butyl-p-hydroxybenzoate | 30 |
| 20 mg. polysorbate 80, U.S.P. | 200 |
| 80 mg. glyceryl monostearate-diethylaminoethyl oleylamide phosphate (19:1) | 800 |
| 35 mg. spermaceti, U.S.P. | 350 |
| 10 mg. 6α-methylprednisolone | 100 |
| 10 mg. flavone | 100 |
| Perfume | 25 |
| Deionized water, q.s., 10 liters. | |

The methylparaben and n-butyl-p-hydroxybenzoate are dissolved in 4.5 liters of deionized water and the solution heated to 70 to 80° C. To this solution are added the propylene glycol, polysorbate 80, glyceryl monostearate-diethylaminoethyl oleylamide phosphate and spermaceti. The temperature of the mixture is maintained at 70 to 80° C. for 30 minutes and then allowed to cool to 35 to 45° C. The 6α-methyl-prednisolone and flavone are then introduced with vigorous mixing, water added to make 10 liters, and the resulting product strained and put through a homogenizer. This product is then ready for assay and packaging for clinical use.

The above lotion is applied twice daily to the inflamed area.

EXAMPLE 5

Nasal spray

A suspension containing 0.01% 6α-methyl-9α-fluoro-11β-hydroxyprogesterone, 0.5% 3-hydroxyflavone and phenylephrine hydrochloride is prepared in a volume of 15 liters from the following materials.

Per ml.:

| | Gm. |
|---|---|
| 5 mg. polysorbate 80, U.S.P. | 75 |
| 1 mg. sodium chloride, U.S.P. | 15 |
| 4.5 mg. sodium citrate, U.S.P. | 67.5 |
| 0.23 mg. myristyl-gamma-picolinium chloride | 3.5 |
| 14.3 mg. glyceryl monostearate | 214 |
| 0.73 mg. diethylaminoethyl oleylamide phosphate | 11 |
| 10 mg. spermaceti, U.S.P. | 150 |
| 10 mg. propylene glycol, U.S.P. | 150 |
| 2.5 mg. phenylephrine hydrochloride, U.S.P. | 37.5 |
| 0.5 mg. sorbic acid | 7.5 |
| 0.1 mg. 6α-methyl-9α-fluoro-11β-hydroprogesterone, micronized | 1.5 |
| 5 mg. 3-hydroxyflavone | 75 |
| Deionized water, q.s., 15 liters. | |

Twelve liters of deionized water is heated in a suitable container to 70 to 75° C. Sodium chloride, sodium citrate, myristyl-gamma-picolinium chloride and sorbic acid are dissolved therein. Polysorbate 80 and propylene glycol are added and the 6α-methyl-9α-fluoro-11β-hydroxyprogesterone and 3-hydroxyflavone thoroughly dispersed in the resulting mixture. Glyceryl monostearate, diethylaminoethyl oleylamide phosphate and spermaceti are then introduced. While stirring constantly, the temperature is maintained at 75° C. for about 30 minutes and then cooled to room temperature. The phenylephrine is then dissolved in the cooled mixture. Deionized water is added to bring the volume to 15 liters, and the resulting product is thoroughly stirred. The product is then ready for assay and packaging for clinical use as a nasal spray.

The foregoing spray is administered three times daily for treatment of nasal inflammation conditions such as allergic rhinitis.

EXAMPLE 6

Drops

A sterile suspension containing 0.02% 6α-methyl-9α-fluoro-21-desoxyhydrocortisone, 1% 3-hydroxyflavone and 0.6% neomycin is prepared from the following types and amounts of materials.

Per ml.:

| | Gm. |
|---|---|
| 10 mg. 3-hydroxy-3-methylaminopropyl (propylamino)-benzoate hydrochloride | 1 |
| 6 mg. neomycin sulfate | 0.6 |
| 4.5 mg. sodium citrate, U.S.P. | 0.45 |
| 150 mg. polyethylene glycol 4000 | 15 |
| 0.2 mg. myristyl-gamma-picolinium chloride | 0.02 |
| 1 mg. polyvinylpyrrolidone | 0.1 |
| 0.2 mg. 6α-methyl-9α-fluoro-21-desoxyhydrocortisone | 0.02 |
| 10 mg. 3-hydroxyflavone | 1 |
| Deionized water, q.s., 100 ml. | |

The foregoing formulation produces a suspension which is stable, readily resuspendable and does not cake. On mixing, sterilizing and suspending, the product is ready for assay and sterile packaging.

The suspension is useful for treatment of eye and ear infections characterized by inflammation. One drop is administered three times daily to the eye or external ear canal.

EXAMPLE 7

Suppository

A suppository containing 0.05% 9α-fluoro-11β,16α,17α,21-tetrahydroxy-1,4-pregnadiene-3,20-dione, 0.5% 4',5-dihydroxyflavone, neomycin, phenylephrine hydrochloride and ethylaminobenzoate is prepared from the following materials:

| | Parts |
|---|---|
| Polyethylene glycol 6000 | 750 |
| Polyoxyethylene sorbitan monostearate | 300 |
| Spermaceti | 330 |
| Polyethylene glycol 400 | 321 |
| Polyoxyethylene palmitate | 150 |
| Sodium sulfate | 900 |
| Coloring powder | 28 |

| | Parts |
|---|---|
| Starch, bolted | 120 |
| Phenylephrine hydrochloride | 6 |
| Ethylaminobenzoate | 75 |
| Neomycin sulfate | 18 |
| 6α-methylprednisolone | 1.5 |
| Flavone | 0.15 |

The polyethylene glycol 6000, polyoxyethylene sorbitan monostearate and spermaceti are melted together at 180 to 190° F. The coloring powder, starch, about 15% of the sodium sulfate and the five active ingredients are dispersed in the polyethylene glycol 400. The dispersion is added to the melted mixture. The balance of the sodium sulfate is added. The whole is stirred at 180 to 190° F. to insure smoothness. The completed mass is allowed to cool and is then poured into chilled containers which are stored approximately 24 hours under refrigeration prior to extrusion to form shaped suppositories weighing 3 gm. each. The product is then ready for assay and packaging.

The foregoing suppositories are given rectally twice daily in the treatment of rectal conditions involving inflammation and infection, such as localized proctitis.

EXAMPLE 8

*Aerosol*

An aerosol containing approximately 0.1% 6α-methylprednisolone 16,17 - acetonide, 0.1% 3,5,7 - trihydroxyflavone and phenylephrine hydrochloride is prepared from the following materials:

| | | |
|---|---|---|
| Absolute alcohol | gm | 4.37 |
| Dichlorodifluoromethane | gm | 1.43 |
| Dichlorotetrafluoroethane | gm | 5.70 |
| Phenylephrine hydrochloride | mg | 45.29 |
| 6α-methylprednisolone acetate | mg | 12.0 |
| 3-hydroxyflavone | mg | 12.0 |

The steroid, flavone and phenylephrine hydrochloride are dissolved in the absolute alcohol and the resulting solution filtered to remove particles and lint. This solution is chilled to about minus 30° C. To this is added the chilled mixture of dichlorodifluoromethane and dichlorotetrafluoroethane. Thirteen ml. plastic-coated amber bottles are cold filled with 11.5 gm. each of the resulting solution and capped with a metering valve. The resulting package, when inverted into an oral inhalation adapter and the valve opened, will deliver a metered dose containing 0.08 mg. of 6α-methylprednisolone acetate, 0.08 mg. of 3-hydroxyflavone and 0.3 mg. of phenylephrine hydrochloride. The product is then ready for assay and clinical use.

The aerosol is administered three times daily in treating allergic or asthmatic conditions of the respiratory tract system which are characterized by local inflammation.

EXAMPLE 9

*Powder inhaler*

One kilogram of an aerosol inhalant powder for treating allergic or asthmatic conditions of the respiratory tract and containing hydrocortisone acetate, 5',7-dihydroxyflavone and isopropylarterenol hydrochloride is prepared from the following materials:

| | Gm. |
|---|---|
| 0.25% isopropylarterenol hydrochloride (crystalline), micronized | 2.5 |
| 0.025% hydrocortisone acetate | 0.25 |
| 0.025% 5',7-dihydroxyflavone | 0.25 |
| 0.50% sorbitan trioleate ("Span 85") | 5.0 |
| 49.50% dichlorodifluoromethane ("Freon 12") | 495.0 |
| 49.50% trichloromonofluoromethane ("Freon 11") | 495.0 |

The finely divided isopropylarterenol, steroid and flavone are triturated well with the sorbitan trioleate and dispersed in the cooled liquid propellant mixture. This slurry is filled into a container fitted with a metering valve nozzle. On operating the valve, the powder will be dispersed in a stream of propellant which will vaporize, providing an aerosol of dry powder.

A single inhalation of the above powder three times daily is used in treatment of asthma.

EXAMPLE 10

*Mastitis preparation*

A lot of 10,000 gm. of a veterinary preparation is made with the following ingredients.

| Each 10 gm. contains: | Gm. |
|---|---|
| 275 mg. neomycin sulfate, micronized | 275 |
| 110,000 units procaine penicillin G | 110 |
| 55,000 units polymyxin B sulfate (10,000 units/mg.) | 5.5 |
| 5 mg. 6α-methyl-9α-fluoro-21-desoxyprednisolone | 5 |
| 5 mg. 3-hydroxyflavone | 5 |
| 30% white mineral oil | 3000 |
| 0.525% chlorobutanol anhydrous | 52.5 |
| 0.5% polysorbate 80 | 50 |
| 0.5% sorbitan monooleate | 50 |
| 40% 2% aluminum monostearate-sesame oil gel | 4000 |
| White petrolatum, q.s. | 10,000 |

Suspend the neomycin sulfate, procaine penicillin, polymyxin B sulfate, 6α-methyl-9α-fluoro-21-desoxyprednisolone and the flavone in 2000 gm. of white mineral oil and mix thoroughly. Mill through Fitzpatrick mill (80 mesh screen). Wash the mill with 1000 gm. of white mineral oil and add. Stir slowly for at least one hour to dissipate entrapped air. Add the chlorobutanol, polysorbate 80 and sorbitan monooleate to 1400 gm. of the 2% aluminum monostearate-sesame oil gel and mix thoroughly with an air mixer until completely dissolved. Strain into the remainder of the 2% aluminum monostearate-sesame oil gel and mix. Melt the petrolatum and strain into the gel, with thorough mixing. Add the mineral oil-powder mixture and adjust the temperature to 120° F., while stirring. Continue stirring only until the temperature is reduced to 100° F. Allow to cool to room temperature before filling into 100-cc. vials or 10-cc. disposable syringes.

Administration by udder instillation in 10 gm. doses once daily affords effective therapy in the treatment of bovine mastitis.

Other antibiotics conventionally employed in the management of veterinary mastitis can be substituted for the neomycin, penicillin and polymyxin above. For example, such antibiotics as erythromycin, novobiocin sodium and dihydrostreptomycin sulfate, in amounts normally employed for such treatment, can be incorporated with the steroid and flavone. Alternatively, other antibacterials such as the sulfonamides, e.g., sulfisoxazole, and nitrofurazone and its derivatives can be used instead of the foregoing antibiotics.

What is claimed is:

1. A topical anti-inflammatory composition comprising: as the primary active ingredients, synergistic amounts of (1) an anti-inflammatory steroid selected from the group consisting of steroids of the formula

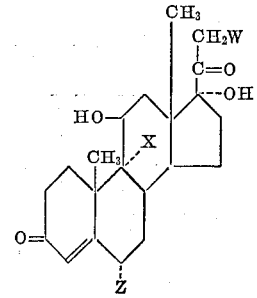

and the corresponding 1-dehydro derivatives thereof wherein W is a member selected from the group consisting of hydrogen, hydroxy and alkanoyloxy in which the alkyl group contains 1 through 5 carbon atoms, X is a member selected from the group consisting of hydrogen and fluoro, and Z is a member selected from the group consisting of hydrogen and methyl, and (2) a compound selected from the group consisting of flavone and 3-hydroxyflavone, said active ingredients dispersed in a pharmaceutically acceptable topical carrier.

2. A topical anti-inflammatory composition comprising: as the primary active ingredients, synergistic amounts of 6α-methylprednisolone acetate and flavone.

3. A topical anti-inflammatory composition comprising: as the primary active ingredients, synergistic amounts of hydrocortisone and 3-hydroxyflavone.

4. A topical anti-inflammatory composition comprising: as the primary active ingredients, synergistic amounts of 6α-methyl-9α-fluoro-11β-hydroxyprogesterone and flavone.

5. A method for treating inflammatory conditions amenable to topical therapy which comprises: topically applying, as the primary active ingredients, a combination of synergistic amounts of (1) an anti-inflammatory steroid selected from the group consisting of steroids of the formula

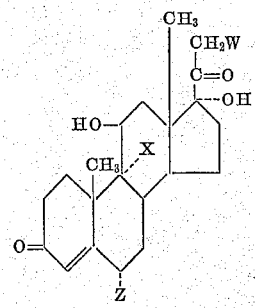

and the corresponding 1-dehydro derivatives thereof wherein W is a member selected from the group consisting of hydrogen, hydroxy and alkanoyloxy in which the alkyl group contains 1 through 5 carbon atoms, X is a member selected from the group consisting of hydrogen and fluoro, and Z is a member selected from the group consisting of hydrogen and methyl, and (2) a compound selected from the group consisting of flavone and 3-hydroxyflavone, said active ingredients dispersed in a pharmaceutically acceptable topical carrier.

6. A method for treating inflammatory conditions amenable to topical therapy which comprises: topically applying, as the primary active ingredients, synergistic amounts of 6α-methylprednisolone acetate and flavone.

7. A method for treating inflammatory conditions amenable to topical therapy which comprises: topically applying, as the primary active ingredients, synergistic amounts of hydrocortisone and 3-hydroxyflavone.

8. A method for treating inflammatory conditions amenable to topical therapy which comprises: topically applying, as the primary active ingredients, synergistic amounts of 6α-methyl-9α-fluoro-11β-hydroxyprogesterone and flavone.

References Cited by the Examiner

UNITED STATES PATENTS 2,801,202   7/57   Poetsch _____ 167—77
2,964,552   12/60  Hogberg et al. _____ 167—81

OTHER REFERENCES

A.M.A. Arch. of Dermatology 79, pp. 103–105, January 1959.

A.M.A. Arch. of Dermatology 76, pp. 185–188.

Clark et al.: Antibiotic Medicine and Clinical Therapy, 7, pp. 33–36, January 1960.

Clinical Medicine, 5, p. 1741, December 1958.

Current List Medical Literature, vol. 28, entry 59344, p. 592 (1955).

Current List Medical Literature, vol. 30, entry 40312, p. R–405 (1956).

Current List Medical Literature, vol. 32, entry 54688, p. R–569 (1957).

Goldberg: Antibiotic Medicine and Clinical Therapy, 5, pp. 372-4, June 1958.

Masri et al.: P.S.E.B.M. 99, December 1958, pages 707–709.

LEWIS GOTTS, *Primary Examiner.*

FRANK CACCIAPAGLIA, Jr., *Examiner.*